United States Patent [19]

White

[11] 4,050,848
[45] Sept. 27, 1977

[54] HYDRO SEAL RETAINER

[76] Inventor: Paul J. White, 809 Olive St., Vista, Calif. 92083

[21] Appl. No.: 671,349

[22] Filed: Mar. 29, 1976

[51] Int. Cl.² ............................................. B64C 11/08
[52] U.S. Cl. ................................ 416/146 A; 416/174
[58] Field of Search ................... 416/146, 146 A, 156, 416/157, 174

[56] References Cited

U.S. PATENT DOCUMENTS

| | | | |
|---|---|---|---|
| 1,895,874 | 1/1933 | Barbarou | 416/174 |
| 2,032,255 | 2/1936 | Caldwell | 416/174 X |
| 2,457,311 | 12/1948 | Kidd | 416/146 |
| 2,792,064 | 5/1957 | Smith | 416/174 X |

FOREIGN PATENT DOCUMENTS

| | | | |
|---|---|---|---|
| 1,258,984 | 3/1961 | France | 416/156 |
| 796,717 | 6/1958 | United Kingdom | 416/174 |

Primary Examiner—Everette A. Powell, Jr.
Attorney, Agent, or Firm—Robert G. Upton

[57] ABSTRACT

This invention is primarily a backup seal safety device to prevent a sudden loss of oil through failure of a pressed expansion plug in the front of a hollow, oil-containing crankshaft commonly associated with aircraft engines that supply oil under pressure to a controllable pitch, constant speed aircraft propeller when this type of propeller is utilized. The plug is installed in these engines when a fixed propeller is installed in place of the constant speed propeller.

4 Claims, 5 Drawing Figures

HYDRO SEAL RETAINER

BACKGROUND OF THE INVENTION

1. Field of the Invention

This invention relates to reciprocating aircraft engines that may be adapted to accept either a controllable pitch, constant speed propeller or a fixed pitch propeller.

More particularly, this invention relates to a reciprocating aircraft engine of the type that supplies oil under pressure to a controllable pitch, constant speed propeller through a hollow crankshaft adjacent the propeller.

2. Description of the Prior Art

Aircraft engines of the type that supply oil under pressure through a hollow front portion of a crankshaft for manipulation of a controllable pitch propeller such as a specific series of lycoming engines manufactured by AVCO LYCOMING DIVISION, Williamsport, PA., provide a Welch-type expansion plug that is positioned in the rear of the hollow front section of the crankshaft if it is desired to install a fixed pitch propeller. To be more specific, a mounting pad is provided, for example, ahead of the number one cylinder in the front of the right crankshaft half of the 0-235-C and 0-290-D that is intended for the installation of a hydraulic valve to actuate a controllable pitch prop. This valve allows engine oil, under pressure, to flow through the hollow crankshaft to the blade rotating mechanism of the propeller. When the valve is closed, the valve halts the oil flow and opens a divertive passage which permits residual oil in the crankshaft and propeller hub assembly to return to the oil sump. The Welch-type expansion plug blocks off this source of oil under pressure within the crankshaft and a fixed propeller may then be installed. These expansion plugs have been known to fail and complete loss of oil from the engine usually means a damaged engine or worse, a forced landing accident.

The present invention prevents a catastrophic loss of oil due to the failure of this expansion plug by providing a safety backup seal device that will retain any oil escaping passed the expansion plug.

SUMMARY OF THE INVENTION

In an aircraft engine that supplies oil under pressure to a chamber formed by the front portion of a crankshaft, the oil under pressure is utilized to manipulate the blade angle pitch of a constant speed, controllable pitch propeller. The chamber is sealed off at its exit end by an expansion plug that is engaged with the interior wall portion of the crankshaft forming the chamber when a fixed pitch propeller is utilized on the engine.

A backup hydro seal apparatus is positioned downstream and adjacent to the expansion plug, the apparatus having outer peripheral walls that conform concentrically with and are sealingly engaged with the interior wall portion formed by the crankshaft to prevent escape of oil under pressure if the expansion plug should fail.

A retention means is provided to retain the backup seal apparatus within the crankshaft.

The present invention provides a hydro seal retainer device to guard against a possible failure of the pressed-in-place Welch-type expansion plug which would result in a catastrophic loss of oil if the backup hydro seal were not in place downstream of the expansion plug.

Therefore, it is an object of this invention to provide a secondary sealing device to prevent egress of oil under pressure supplied to the front hollow portion of an aircraft engine crankshaft if the primary seal fails.

It is a further object of this invention to provide a backup hydro seal device that is retained inside of the hollow crankshaft downstream of the primary seal.

Another object of this invention is to provide a backup hydro seal apparatus that requires no modification to the original components of an aircraft engine.

It is yet another object of this invention to provide a single and quick means of adapting the present invention to an aircraft engine of the type herein before described.

An advantage over the prior art is the ability to provide a means to prevent a catastrophic loss of oil pressure in the event the pressed-in-place expansion plug should fail.

Yet another advantage over the prior art is the method of adapting the safety backup hydro seal device without modification to the original equipment of an aircraft engine.

The above-noted objects and advantages of the present invention will be more fully understood upon the study of the following description in conjunction with the detailed drawing.

DESCRIPTION OF THE PREFERRED EMBODIMENTS

Figure 1:
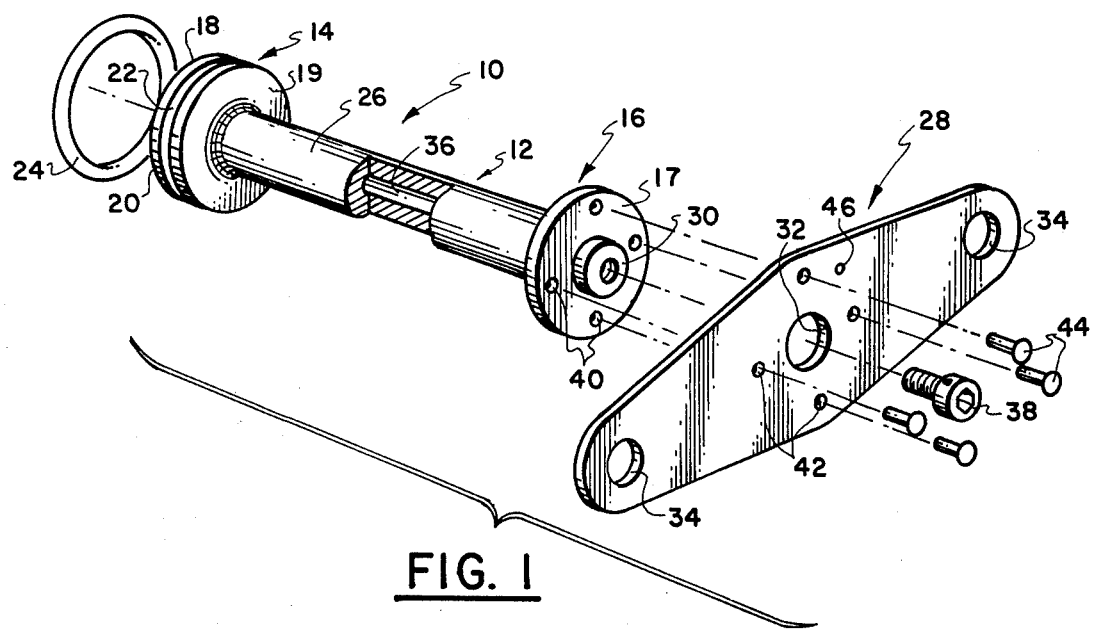
FIG. 1 is an exploded perspective view, partially cut away illustrating the hydro seal retainer apparatus.
Figure 2:
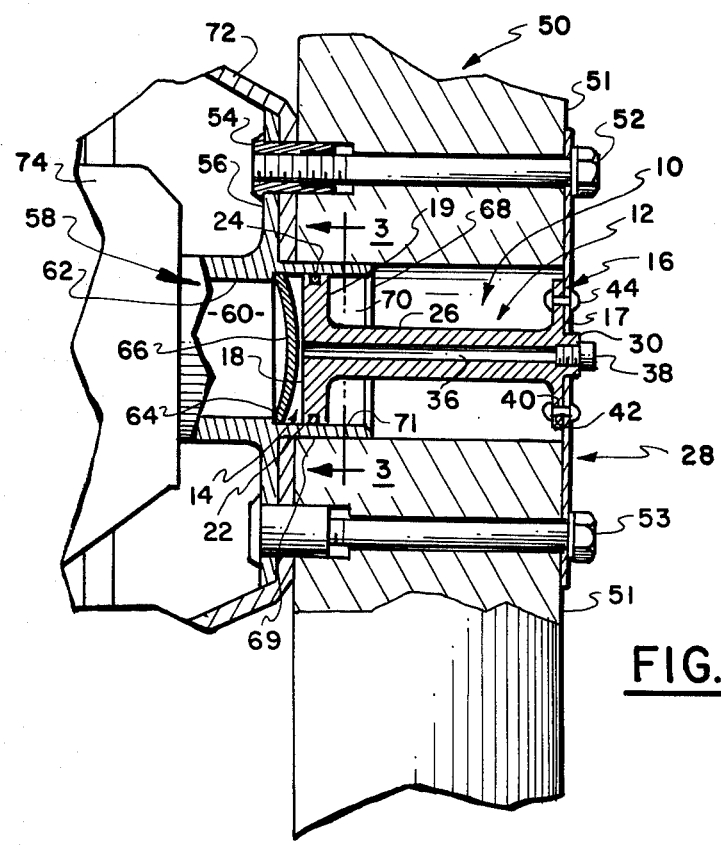
FIG. 2 is a cross-sectional view of the seal retainer positioned in a hollow crankshaft.

Referring now to FIG. 1, the hydraulic seal retainer generally designated as 10 consists of a retainer body 12 having a sealing end 14 at one end and a seal retaining flange 17 at the other end 16 interconnected by a stem or shank 26. Seal end 14 comprises an end face 18, a cylindrical wall portion 20 and a support base or surface 19 that transitions into stem or shank 26. An annular O-ring groove 22 is cut into cylindrical wall 20 transverse to the axis of the seal retainer 10 to accept an O-ring 24. At the opposite end 16, flange 17 has a collet or annular extension 30 centrally positioned that engages opening 32 that is defined by a propeller attach plate generally designated as 28. Attach plate 28 spans across the distance defined by a pair of propeller attach bolts 180° apart and openings 34 allow passage therethrough of the attach bolts as illustrated in FIG. 2. A series of equidistantly spaced matching holes 40 and 42 are drilled through both flange 17 and plate 28 to accept suitable rivets 44. Obviously other types of attaching means to connect the plate 28 to flange 17 may be utilized without departing from the scope of this invention.

An axially aligned orifice or vent passage 36 is drilled entirely through stem or shank 26. The vent passage 36 is tapped at the exit end 37 at seal retaining end 16. A vent cap screw 38 or the like is retained in tapped end 17 and secured within the threaded end by, for example, a length of safety wire (not shown) inserted through hole 46 in plate 28. The purpose of the vent passage 36 will be more fully understood with reference to FIG. 2.

Turning now to FIG. 2, the hydro seal retaining device is positioned within the end of a crankshaft 58 an, for example, AVICO Lycoming 10-360 engine. The crankshaft 58 exits engine case 74 and terminates in a propeller flange 56. A propeller centering collet 69 is an integral part of the crankshaft 58. The end of the crankshaft defines a hollow chamber 60 by interior walls 62. Downstream from chamber 60 is a shoulder 64 that defines enlarged chamber 70 along with interior walls 71 that terminates at end 68. A Welch-type expansion plug 66 is wedged against shoulder 64 when it is desired to close off chamber 60 which contains oil under pressure when a fixed pitch propeller 50 is utilized. The hydro seal retaining device 10 is inserted with chamber 70 of crankshaft 58 by first removing the vent capscrew or plug 38 followed by removal of propeller bolts 52 and 53 (180° apposed). The device 10 is then engaged with walls 71 through end 68 of crankshaft 58. The passage 36 communicating with chamber 70 allows trapped air between the expansion plug 66 and end face 18 of end 14 to exit the seal retainer. The O.D. of the sealing end 14 may be, for example, 2.004 plus or minus 0.001 and the width of the groove 22 may be about 0.188 and the diameter measured at the "bottom" of the groove 22 may be 1.761 plus or minus 0.001. The above parameters will accommodate, for example, a Parker O-ring number 2-224-N304-7 (MIL-P-25732) manufactured by Parker Seal Company of Lexington, Kentucky. This specific example will provide an adequate seal in the event the expansion plug 66 fails in a 10-360 Lycoming engine, the diameter of chamber 70 defined by interior walls 71 is about 2.008. The hydro seal retainer may be fabricated from, for example, aluminum, stainless steel or the like.

After the propeller attach plate 28 contacts the face 51 and the holes 34 are aligned with the corresponding prop holes, the propeller attach bolts 52 and 53 are torqued within their respective attach nuts 54. The vent cap screw is then reinstalled in threaded end 17 and subsequently safety wired per accepted aircraft maintenance procedures.

Figure 3:
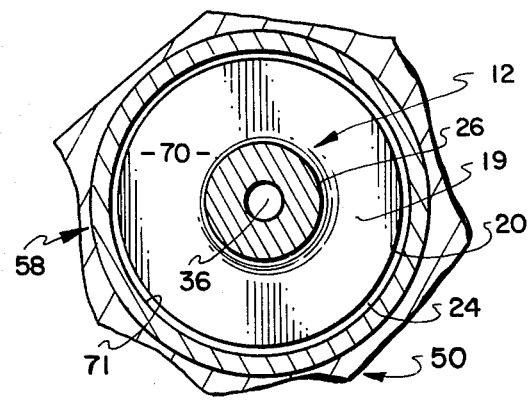
FIG. 3 is a view taken along lines 3—3 of FIG. 2.

FIG. 3 illustrates the sealing end 14 securely engaged with walls 71 defined by crankshaft 50, O-ring 24, thus providing a hydraulic seal preventing egress of oil under pressure in the event of expansion plug failure.

Figure 4:
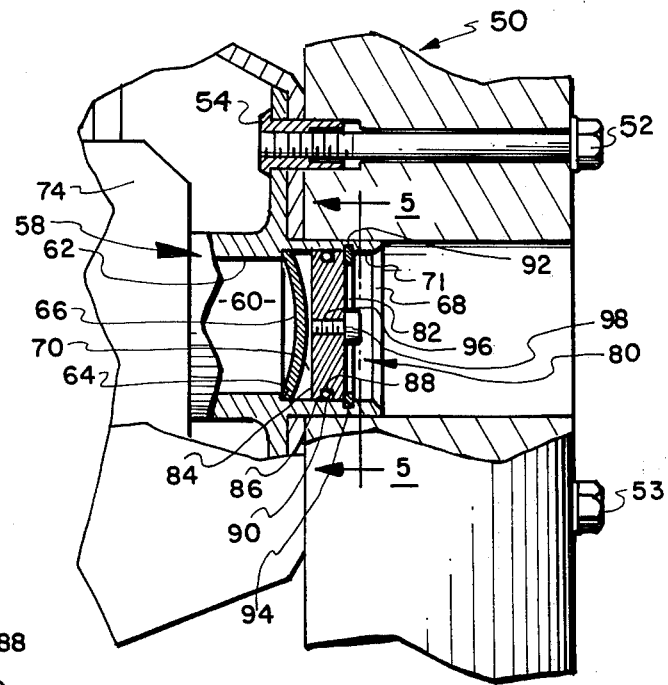
FIG. 4 is a view, partially in cross-section of an alternative hydro seal retainer.

FIG. 4 depicts an alternative embodiment of the invention. The hydro seal retainer generally designated as 80 is simply a solid section of a cylinder having at a first end 84 positionable adjacent to expansion plug 66 and a second upstream face 82 exposed to the atmosphere. A peripheral wall portion 86 defines an annular O-ring groove 88 to accept O-ring 90. A threaded vent passage 96 is centrally and axially positioned through the body of the backup seal 80. A vent capscrew 98 closes off the passage 96 after installation of the device 80 as described with reference to FIG. 2. A vented backup seal insertion tool (not shown) could be inserted into the threaded passage for use when installing the backup seal device 80. A groove or slot 94 is machined into the interior walls 71 defined by the end of crankshaft 58 so that, for example, a snap ring may be installed within the slot for retention of the hydro seal apparatus 80.

Figure 5:
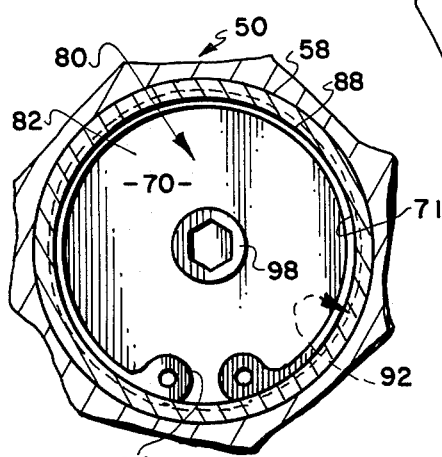
FIG. 5 is a view taken along lines 5—5 of FIG. 4.

FIG. 5 depicts the end face 82, the O-ring in engagement with walls 71, the snap ring 94 in slot 92 and the vent capscrew 98.

It will of course be realized that various modifications can be made in the design and operation of the present invention without departing from the spirit thereof. Thus, while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

I claim:

1. In an aircraft engine that normally supplies oil under pressure to a chamber formed by the front portion of a crankshaft, said oil under pressure being utilized to manipulate the blade angle pitch of a constant speed, controllable pitch propeller, said chamber being subsequently sealed off at its exit end by an expansion plug that is engaged with the interior wall portion of said crankshaft forming said chamber when a fixed pitch propeller is substituted for said controllable pitch propeller, the improvement which comprises:

a backup seal apparatus positioned downstream and adjacent to said expansion plug, said apparatus having outer peripheral walls that conform concentrically with and are sealingly engaged with said interior wall portion formed by said crankshaft to prevent escape of said oil under pressure if said expansion plug should fail, said backup seal apparatus having a first oil seal end and a second seal retaining end, said second seal retaining end positioned downstream of said first end and connected to said first seal end by a shaft means therebetween, said second retaining end having at least a pair of flanges extending outwardly therefrom 180 degrees apart adapted to accept at least two of the fixed pitch propeller retaining bolts through holes formed in said flanges to retain said backup seal apparatus within said chamber.

2. The invention as set forth in claim 1 wherein said first oil seal end is a cylinder adjacent to said expansion plug having a first and a second surface, said cylinder having at least one recessed groove about midway between said first and second surface and transverse to the walls of said cylinder, said at least one groove being adapted to receive at least one seal ring device to seal against said interior walls of said crankshaft.

3. The invention as set forth in claim 1 wherein said at least one seal ring device is a resilient O-ring.

4. The invention as set forth in claim 1 further comprising an orifice passage formed by said backup seal apparatus axially positioned through said first sealing end and exiting through said second seal retaining end, said orifice communicating with a chamber formed by the outside surface of said expansion plug, the interior walls of said crankshaft and said first surface of said first oil seal end, said orifice being plugged off at said second end by a removable vent plug, said orifice passage serving to remove trapped air between said expansion plug and said first sealing end of said apparatus when said vent plug is removed during installation of said backup seal apparatus.

* * * * *